United States Patent

[11] 3,587,351

| [72] | Inventors | Robert C. Keller<br>Troy;<br>Leslie K. Walters, Warren, Mich. |
|---|---|---|
| [21] | Appl. No. | 869,197 |
| [22] | Filed | Oct. 24, 1969 |
| [45] | Patented | June 28, 1971 |

[54] TRANSMISSION AND CONTROLS WITH NEUTRAL START SWITCH
10 Claims, 9 Drawing Figs.

[52] U.S. Cl..................................................... 74/850,
74/477, 123/179
[51] Int. Cl.................................................B60k 21/00,
G05q 5/00, F02n 17/00
[50] Field of Search........................................... 74/850,
843, 477; 123/179

[56] References Cited
UNITED STATES PATENTS

| 2,934,054 | 4/1960 | Quinlan...................... | 74/850X |
| 3,151,496 | 1/1964 | Winchell..................... | 74/850 |
| 3,292,451 | 12/1966 | Jacklin et al................. | 74/477 |
| 3,367,204 | 2/1968 | Chadwick II................. | 74/477 |
| 3,452,614 | 7/1969 | Conkle........................ | 74/477 |
| 3,521,612 | 7/1970 | Santi et al.................... | 74/850X |

Primary Examiner—Arthur T. McKeon
Attorneys—W. E. Finken, A. M. Heiter and Charles R. White ABSTRACT: Controls for a manual transmission incorporating an interlock that prevents simultaneous selection of two gear ratios at the same time. A neutral start switch is employed for controlling the engine starter circuit. In one embodiment the start switch is actuated by double lever interlock components and in another embodiment by camming action of locking balls disposed between parallel shift rails. The transmission controls and neutral start switch and controls are supported in a cover plate for the access opening in the transmission housing.

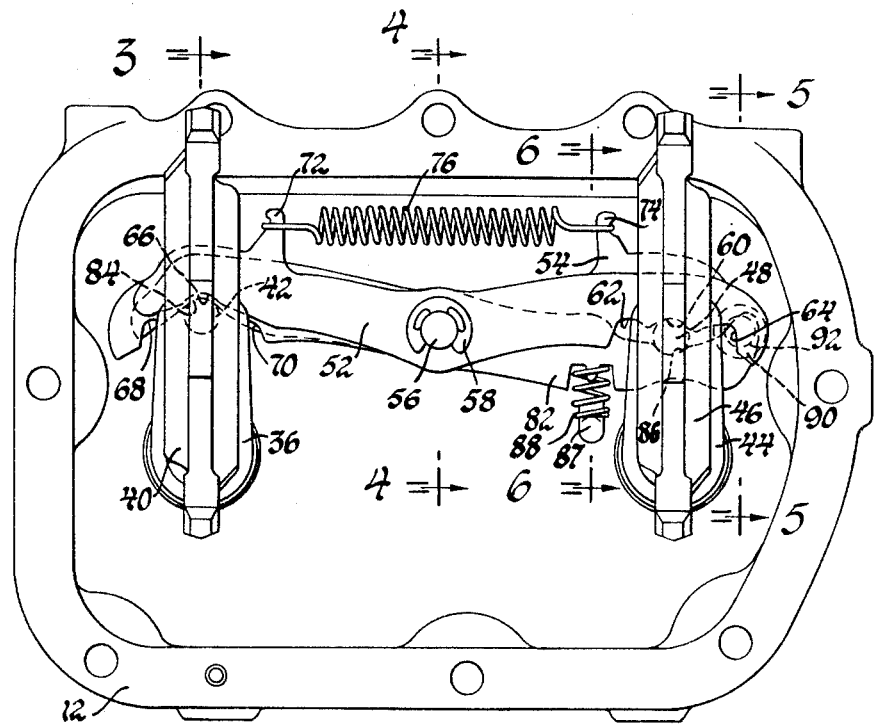
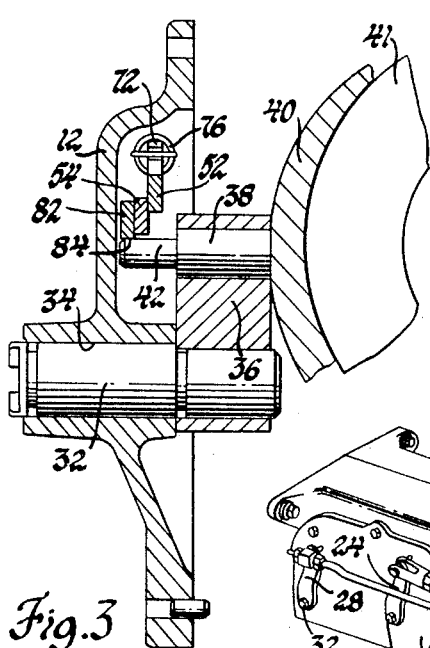
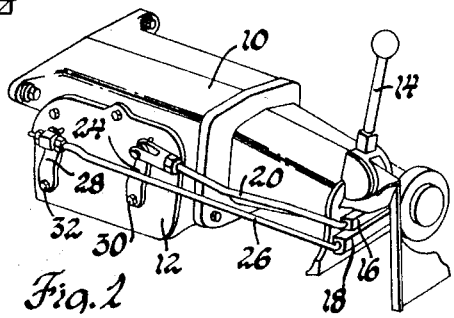
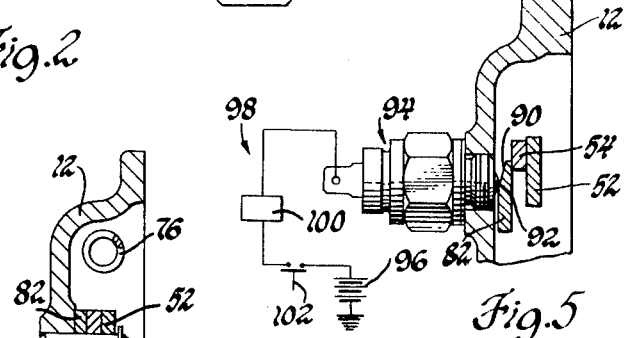
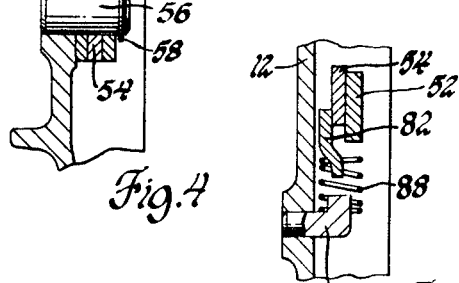

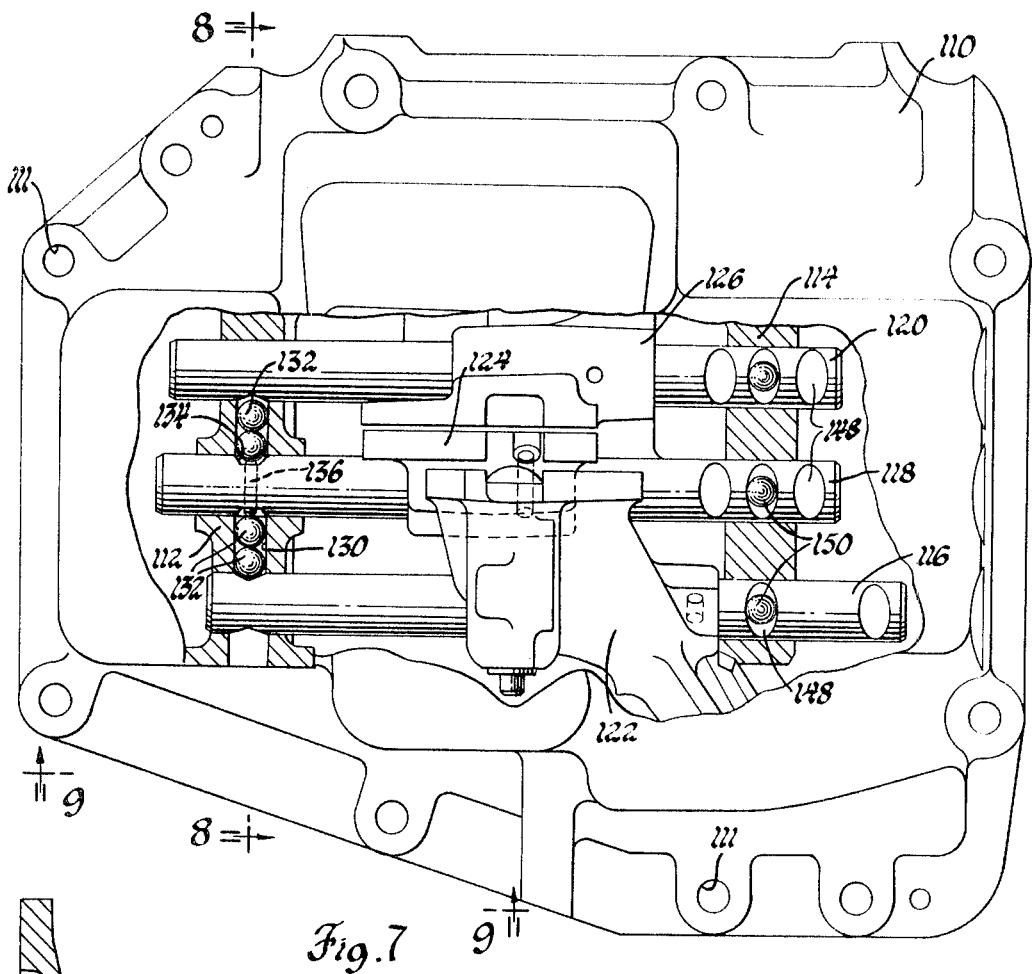
Fig. 7
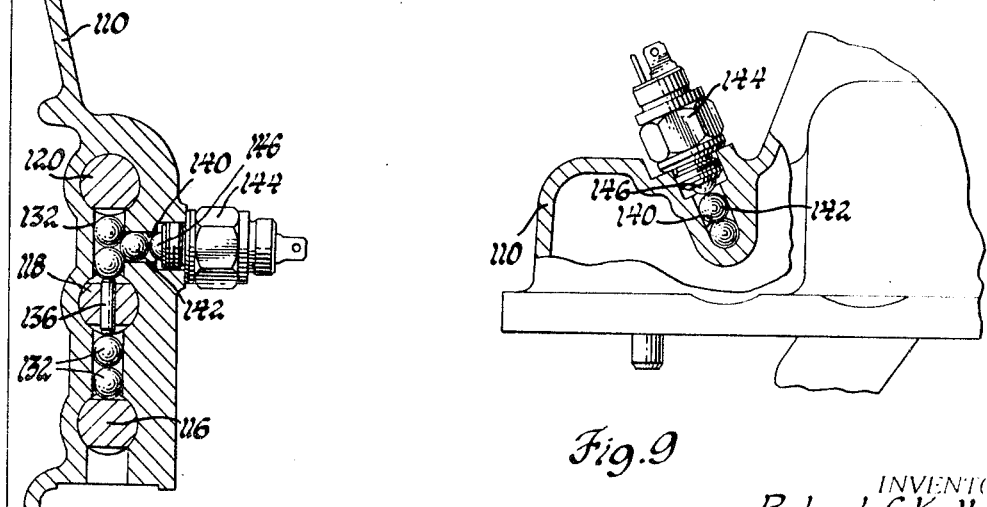
Fig. 8
Fig. 9
INVENTORS.
Robert C. Keller, &
BY Leslie K. Walters
Charles R. White
ATTORNEY

TRANSMISSION AND CONTROLS WITH NEUTRAL START SWITCH

This invention relates in general to transmissions and more particularly to manual transmissions and controls incorporating a neutral start switch.

In both automatic and manual transmission special neutral start switches, which close only when the transmission is in neutral, have been employed to ready the engine starter circuit for completion when the ignition switch is closed. In the majority of these prior art transmissions the inclusion of a neutral start switch and controls has made the transmission controls considerably more complex and has required extensive redesign of the operating components of the transmission controls for switch operation.

This invention is readily adaptable to current transmissions without appreciable redesign of transmission components. It is particularly adaptable to the widely used manual transmission controls having double interlock levers and the neutral start switch is operated directly by components of the interlock. In one embodiment of the invention, the neutral start switch is operated by locking pins on the shifter forks; these pins operate a third lever nested above the interlock levers having a cam surface to close and open the neutral start switch affixed to the transmission case to correspond to transmission operating conditions. In another embodiment in which shift controls have a plurality of parallel shifter rails and a camming ball interlock, the neutral start switch actuator employed is operated directly by the camming balls. The start switch opens when any rail is moved from its neutral position.

With this invention, operation of the engine starter motor is positively prevented unless the transmission is in neutral. This protects the starter motor and its drive connection with the engine crankshaft when the engine is firing. Also, this invention provides an additional control over the transmission and prevents geared starts.

In this invention all of the controls including the switch and switch operator are supported by the cover plate which covers the access opening in the transmission case. With this construction, installation, inspection and repair are facilitated since these components can be first assembled as a bench assembly and then united with the transmission when the vehicle is built. Improved inspection and repair is possible since the cover plate can be easily removed from the transmission case and moved to a convenient work area.

These and other objects and features of this invention will become more apparent from the following detailed description and drawings in which:

FIG. 1 is a prospective view of a transmission and controls.

FIG. 2 is a side view of the inside of a transmission cover plate and controls secured thereto.

FIg. 3 is a view taken on lines 3–3 of FIG. 2.

FIG. 4 is a view taken along lines 4–4 of FIG. 2.

FIG. 5 is a view taken along lines 5–5 of FIG. 2.

FIG. 6 is a view taken along lines 6–6 of FIG. 2.

FIG. 7 is a side view of a transmission cover plate and controls of a second embodiment of the invention.

FIG. 8 is a view taken along lines 8–8 of FIG. 7.

FIG. 9 is a view taken along lines 9–9 of FIG. 8.

As shown in FIG. 1 there is a housing 10 for a manual transmission having a side cover plate 12 over an access opening, which plate is secured to the housing by bolts or other suitable fasteners. The transmission is a multiratio transmission preferably having three or four forward speed gear ratios and one reverse ratio. The four-speed transmission disclosed in U.S. Pat. No. 3,088,336 to Fodrea and the three-speed transmission disclosed in the U.S. Pat. No. 2,171,953 could be readily employed with this invention. The housing supports a conventional transmission hand control lever 14 which operates reverse-first lever 16 and a second-third lever 18. The reverse-first lever (R–1) 16 is connected by a rod 20 to the reverse-first shift lever R–1) 24 and second-third lever 18 is connected by rod 26 to the second-third shift lever (2–3) 28. The R–1 shift lever 24 is rigidly mounted on the reverse-first rock shaft 30 and the 2–3 shift lever 28 is rigidly mounted on the second-third rock shaft 32.

Similar constructions are used to operatively connect the laterally spaced shifter shafts and separate components of the transmission. As illustrated in FIG. 3, the second-third rock shaft 32 is pivotally mounted in a bearing aperture 34 in the cover plate 12. This shaft has a shift fork lever 36 rigidly fixed thereto at its inner end. The outer end of the fork lever has a bearing aperture for receiving the trunnion portion 38 of a second-third shift fork 40. The trunnion 38 permits limited turning of the fork relative to the fork lever during gear ratio changes to prevent any binding and uneven fork wear. The shift fork 40 engages in a shift collar 41 of a synchronized transmission such as that disclosed in the identified patent to Fodrea. The trunnion has an integral and coaxially extending portion forming a locking pin 42 that projects into the cover plate as shown in FIG. 3.

The construction for operatively coupling the first-reverse rock shaft 30 to the transmission is substantially the same as that just described in connection with the second-third rock shaft. The rock shaft 30 is connected to a fork lever 44 and a shifter fork 46 is movably connected to the outer end of the fork lever 44 by a trunnion portion such as that previously described. This shifter fork also has a locking pin 48 that extends from the trunnion portion into the cover plate.

FIg. 2 best shows a pair of interlock levers 52 and 54 each having the trunnion central aperture for receiving a pivot pin 56. This pin is press fitted in the cover plate to support the levers 52 and 54 for limited pivotal movement within the cover plate and within the transmission housing. A C-shaped retainer ring 58 installed in a groove in the end of the pin 56 retains the levers on the pin. The level 52 has three shallow locking cam recesses at one end. There is a neutral recess 60, a reverse speed recess 62 and a first speed recess 64. The speed recesses are disposed on opposite sides of the neutral recess and cam lobes are located in between. All of the recesses are fashioned to engage the locking pin 48 extending from the first reverse shifter fork. At the other end of lever 52 there is a deeper interlocking cam recess 66 that cooperates with the locking pin 42 extending from the trunnion of the second-third shifter fork 40. The other lever 54 is similar in construction to lever 52 with three shallow recesses cooperating with the locking pin 42 including a neutral recess located between second-speed recess 68 and third-speed recess 70. This lever also has a deeper interlock cam recess at the other end that cooperates with the locking pin 48. The lever 52 has a spring anchor tab 72 and the lever 54 has a spring anchor tab 74 between which a coil spring 76 is connected to bias lever 52 to rotate on pivot 56 in a clockwise direction and to bias lever 54 to rotate in a counterclockwise direction on the pivot pin.

The two locking levers function to prevent movement of either of the shift fork levers from the neutral position shown in FIG. 2 to any shift position unless the other shift fork is in the neutral position. This will also prevent movement of both shift forks from the neutral position.

The spring 76 exerts a force on each of the levers so that the end of each lever with the three recesses engages the associated locking pin; also the other end of each lever with the single deep recess is withdrawn from its associated locking pin.

If the transmission is in neutral and a low-speed ratio is desired, the control lever 14 is moved to the low-speed position. The R–1 lever, the rock shaft 30 and the fork lever 44 are turned with shift lever movement. On initial movement of the fork lever 44 toward the first ratio position, the pin 48 passes under the lobe between the neutral recess 60 and the first-speed recess 64 to rotate interlock lever 52 counterclockwise. Gear change to low ratio is achieved since shift fork lever 36 and pin 42 are in their neutral positions and the interlock lever 52 may rotate so that the locking pin 42 enters the recess 66.

If the shift fork lever 36 and pin 42 are not in a neutral position, one of the surfaces on lever 52 adjacent to the recess 66 will be in engagement with the pin 42 to prevent any appreciable turning movement of lever 52. In this event, the shift fork lever 36 cannot be moved and the ratio change is prevented.

The operation of the interlock for reverse, second and third speed ratio is similar to that described. The U.S. Pat. to Popovich et al. No. 3,264,894 provides a complete description of the interlock.

In this invention there is a third lever 82 mounted on the pivot pin 56 between the cover plate and the interlock lever 54. This lever is similar in shape to the two interlock levers but has cam surfaces 84 and 86 instead of the notches for engaging the locking pins 42 and 48 respectively.

A helical spring 88 is supported between an inwardly extending spring holder 87 secured to the cover plate and a recessed portion along the edge of the lever 82 as shown. This spring biases the lever 82 counterclockwise so that the cam surfaces engage the locking pins. Lever 82 has an inclined or tapered end portion 90 providing a switch-operating cam which contacts the longitudinally movable actuator 92 of an electric switch 94. This switch is securely fastened to the cover plate by screw threads as shown in FIG. 5 and is operatively connected to a battery 96 by a circuit 98. This circuit includes an engine starter motor 100 and an ignition switch 102.

In the neutral position the switch 94 is closed since the switch actuator is on a low part of the tapered end portion 90 of the lever. As the lever 82 is moved from its neutral position, the actuator 92 will be cammed upwardly by the tapered end portion 90 to disconnect switch 94. This breaks circuit 98 and the engine cannot be started even if the ignition switch 102 is closed.

The spring 88 keeps the cam surfaces 84 and 86 of the lever 82 in constant engagement with locking pins 42 and 48 respectively. When either shifter shaft 30 or 32 is turned from a predetermined position, the lever 82 will follow that movement. Thus, when either shifter fork is moved from a neutral position, the vehicle engine cannot be started.

FIGS. 7-9 illustrate a second embodiment of the invention in which there is a cover plate 110 for a transmission and case such as that described in connection with the first embodiment. The cover plate is fastened to the case by bolts which extend through the openings 111 in the flange. The cover plate also has spaced and inwardly extending supports 112 and 114. These supports have aligned openings for slidably receiving reverse shift rail 116, 1-2 shift rail 118 and the 2-3 shift rail 120. Rails 116, 118 and 120 have separate shifter heads 122, 124 and 126 respectively affixed thereto. A suitable pivotal and slidable shift control rod, such as that shown and described in U.S. Pat. No. 3,382,732 to Oram et al., is employed to selectively connect any of the shifter heads to a conventional shift lever or other control so that the vehicle operator can change the gear ratios as desired.

Each shifter head supports a shift fork or other connector which operatively connects the respective shift rail with the shift collars of the transmission which in this case may be the four-speed forward and one-speed reverse transmission as shown in the identified patent to Fodrea.

Shifting is achieved by moving the shift lever in a gear-select motion to select and operatively connect a particular shifter head with the control lever. The lever is then actuated to move the selected shifter head and rail longitudinally in the transmission case and effect a ratio change.

Rail support 112 has a passage 130 formed longitudinally therein in which locking balls 132 are movably mounted. These balls are adapted to engage in shallow notches 134 formed in rails 116 through 120 to positively lock and prevent movement of any two rails at the same time. Thus, if the notches are aligned in their neutral position as shown in FIG. 7, movement of one rail, for example, rail 116, will cam the balls upwardly and the ball immediately below rail 118 to engage in the notch 134 in rail 118 to lock rail 118 in position as rail 116 is moved to the reverse ratio position. As the locking ball engages the notch in rail 118, it displaces a pin 136 slidably supported in a small transverse bore in rail 118. When the pin is engaged as described, it is displaced toward rail 120. This pin then moves the locking balls 132 between rail 118 and 120 laterally and forces the end ball immediately below rail 120 into the notch in rail 120 to prevent movement of that rail. Similar locking action will occur to lock reverse rail 116 and 2-3 shift rail in their neutral position on movement of the 1-2 rail 120 from the neutral position. Also, if all the rails are in neutral position, movement of rail 118 from its position for gear ratio selection will simultaneously force the balls into locking engagement with the two end rails 116 and 120 thereby holding them in position.

Disposed in a bore 140 in the cover plate above the locking balls between rails 118 and 120 is an actuator ball 142. In neutral the balls are pyramided with the actuator ball above and between the two locking balls. The actuator ball moves in its bore in response to camming movement of the locking balls from their neutral position.

A switch 144 is threadedly fastened to the cover plate and has a contact portion 146 which extends down in bore 140 and into engagement with the actuator ball 142 best shown in FIGS. 8 and 9. This switch is part of the engine starter circuit such as that described in connection with the first embodiment above.

In the neutral position shown the switch is closed and the engine of the vehicle may be started upon closing of the ignition switch. However, if the transmission has been shifted into one of the gear ratios, the switch actuator will be moved upwardly by the upward movement of the actuator ball to open the switch. Under these conditions, the engine cannot be started by closing of the ignition switch.

The notches 148 shown in FIG. 7 in each of the rails are detent notches which are engageable by ball detents 150 to assist in holding the rails in a predetermined position such as neutral, reverse or the forward drive ratios.

The embodiments described above are illustrative of our invention which invention is defined by the claims which follow:

We claim:

1. In combination with a transmission having a plurality of different gear ratios, a case for said transmission, plural control means mounted for movement within said case for effecting gear ratio change of said transmission, movable interlock means operatively connected with said control means for locking any one of said control means in a stationary position while another of said control means is being moved to effect a gear ratio change in said transmission, an engine starter circuit including switch means supported by said transmission case and an ignition switch operatively connected to said switch means, and said interlock means including operator means for opening said switch means when locking any one of said control means to thereby prevent completion of said engine starter circuit by closure of said ignition switch.

2. The combination of claim 1 above wherein said interlock means is operated by each of said control means in response to movement of any of said control means from a neutral position and said switch operator means comprising cam means movably supported in said case and operated by said interlock means for opening and closing said switch means.

3. The combination of claim 1 wherein said control means comprises a plurality of spaced rock shafts and a shifter fork operatively connected to each of said rock shafts, said operator means comprising a locking pin extending from each of said shifter forks, said interlock means comprising first and second interlock levers pivotally mounted by said case and engageable by said locking pin to insure that only one of said rock shafts and shifter forks is shifted from a predetermined position at any one time, and a third lever operatively engaging said switch means and contacted by said locking pins for movement thereby for opening and closing said switch means.

4. The combination of claim 1 wherein said control means comprises a plurality of movable shift rails operatively connected to said transmission, said interlock means comprising a plurality of locking balls movably mounted in a passage in said case and disposed between said rails, said switch operator means being a switch actuator member disposed between said switch means and said locking balls and movable in response to movement of said locking balls when locking at least one of said rails in a neutral position as another of said rails is moved into a position for changing transmission gear ratio.

5. In combination with a transmission having a plurality of forward gear ratios and a reverse gear ratio, a case for said transmission having a transmission access opening therein, a cover plate for said opening, first and second shifter shafts mounted in said cover plate, a shift member operatively connected to each of said shifter shafts, a shifter fork connected to said shifter member, an extension extending from said shift fork, first and second interlocking levers pivotally mounted on said cover and cooperating with said extensions to interlock said forks so that only one of said forks can be shifted from a neutral position at any time, a third lever mounted on said cover having cam surface thereon, a switch mounted in said cover plate having contact portion engaged by said cam surface, said switch being part of a circuit which further includes engine starter motor and an ignition switch, said extensions being in engagement with said third lever and moved by said extension from a predetermined position to open said switch when the transmission is in one of said gear ratios to prevent completion of said circuit when said ignition switch is closed.

6. The combination defined in claim 5 above wherein said third lever is elongated and has a cam portion on one end engaging a first of said extensions and a cam portion on the other end for engaging another of said extensions.

7. The combination defined in claim 5 and further including spring means operatively connected to said cover plate and engaging said third lever for biasing said third lever into simultaneous engagement with said extensions.

8. In combination with a transmission having gearing providing a plurality of forward drive gear ratios and a reverse drive gear ratio, a case for said transmission having access opening therein, a cover plate for said opening, a plurality of shifter rails supported by said cover plate and movably mounted therein for changing the ratios of said transmission, first and second camming balls movably mounted in said cover plate and disposed between two adjacent rails to provide an interlock, recess means in said rails for receiving said balls, a switch operatively connected to said transmission case, a switch actuator disposed adjacent to said balls, said switch actuator being in contact with said camming balls to open said switch when said transmission is conditioned for a predetermined ratio by movement of any one of said rails.

9. The combination defined in claim 8 wherein said shifter rails are first, second and third parallel shifter rails, said locking balls being disposed between said first and second and said third shifter rails, a pin disposed in said second rail in alignment with said locking balls, said switch actuator being disposed in a plane adjacent to said locking balls and said first rail being movable to actuate all of the locking balls to lock the other two of the said rails and cause said switch actuator to open the switch.

10. The combination defined in claim 8 wherein said switch actuator is a ball mounted in a bore in said cover plate in communication with said locking balls.